US012763460B2

(12) United States Patent
Hu et al.

(10) Patent No.: US 12,763,460 B2
(45) Date of Patent: Oct. 13, 2026

(54) ANTENNA MODULE AND ELECTRONIC DEVICE

(71) Applicant: Beijing Xiaomi Mobile Software Co., Ltd., Beijing (CN)

(72) Inventors: Li Hu, Beijing (CN); Wanbo Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 291 days.

(21) Appl. No.: 18/587,802

(22) Filed: Feb. 26, 2024

(65) Prior Publication Data

US 2024/0291142 A1 Aug. 29, 2024

(30) Foreign Application Priority Data

Feb. 28, 2023 (CN) ......................... 202310211921.1

(51) Int. Cl.

*H01Q 1/52* (2006.01)
*H01Q 1/22* (2006.01)
*H01Q 21/00* (2006.01)
*H01Q 23/00* (2006.01)

(52) U.S. Cl.

CPC ............... *H01Q 1/521* (2013.01); *H01Q 1/22* (2013.01); *H01Q 21/0006* (2013.01); *H01Q 23/00* (2013.01)

(58) Field of Classification Search

CPC ...... H01Q 1/521; H01Q 1/22; H01Q 21/0006; H01Q 23/00; H01Q 1/241; H01Q 21/28; H04B 7/04; H04B 1/0475; H04B 1/12; H04B 1/40

See application file for complete search history.

(56) References Cited

U.S. PATENT DOCUMENTS

| | | | | |
|---|---|---|---|---|
| 9,392,547 B2 * | 7/2016 | Hong | H04B 7/0871 | |
| 2012/0112852 A1 * | 5/2012 | Manssen | H04B 17/12 | 333/112 |
| 2016/0119110 A1 * | 4/2016 | Kim | H04L 5/1461 | 370/278 |
| 2021/0211107 A1 * | 7/2021 | Liu | H04B 1/40 | |

FOREIGN PATENT DOCUMENTS

| | | | | |
|---|---|---|---|---|
| CN | 101901961 A | 12/2010 | | |
| EP | 0905914 A2 * | 3/1999 | | H04B 1/126 |

* cited by examiner

*Primary Examiner* — Curtis A Kuntz
(74) *Attorney, Agent, or Firm* — McCoy Russell LLP

(57) ABSTRACT

An antenna module includes: a primary transceiving unit, wherein the primary transceiving unit includes a first antenna; a diversity receiving unit, wherein the diversity receiving unit includes a second antenna; and an interference cancellation unit, wherein the interference cancellation unit includes a signal output unit, the signal output unit is configured to transmit a cancellation signal to the second antenna, the cancellation signal is configured to cancel a spatially-coupled interference signal received by the second antenna, and the spatially-coupled interference signal is a transmission signal entering the second antenna from the first antenna through spatial coupling.

14 Claims, 3 Drawing Sheets

ANTENNA MODULE AND ELECTRONIC DEVICE

CROSS-REFERENCE TO RELATED APPLICATION

The present application claims the benefit of priority to Chinese Application No. 202310211921.1, filed on Feb. 28, 2023, the contents of which are incorporated herein by reference in their entireties for all purposes.

BACKGROUND

An antenna module can include a primary transceiving unit and a diversity receiving unit. When the diversity receiving unit and the primary transceiving unit work simultaneously, a transmission signal from an antenna of the primary transceiving unit will enter an antenna of the diversity receiving unit through spatial coupling.

SUMMARY

For solving the problems in the related art, the disclosure provides an antenna module and an electronic device.

In a first aspect, an antenna module is provided in an example of the disclosure. The antenna module includes: a primary transceiving unit, where the primary transceiving unit includes a first antenna; a diversity receiving unit, where the diversity receiving unit includes a second antenna; and an interference cancellation unit, where the interference cancellation unit includes a signal output unit, the signal output unit is configured to transmit a cancellation signal to the second antenna, the cancellation signal is configured to cancel a spatially-coupled interference signal received by the second antenna, and the spatially-coupled interference signal is a transmission signal entering the second antenna from the first antenna through spatial coupling.

In a second aspect, an electronic device is provided in an example of the disclosure. The electronic device includes any one of the above antenna modules.

It should be understood that the above general description and the following detailed description are merely illustrative and explanatory, and are not intended to limit the disclosure.

BRIEF DESCRIPTION OF THE DRAWINGS

The accompanying drawings here are incorporated in the description as a constituent part of the description, illustrate examples conforming to the disclosure, and serve to explain the principles of the disclosure along with the description.

REFERENCE NUMERALS

110—primary transceiving unit; 120—interference cancellation unit; 130—diversity receiving unit; 211—first antenna; 212—transceiving chip; 221—second antenna; 222—matching circuit; 223—low-noise amplifier; 224—receiving chip; 231—first coupler; 232—attenuator; 233—phase shifter; and 234—second coupler.

DETAILED DESCRIPTION

Examples will be described in detail here and are illustratively shown in the accompanying drawings. When the following description relates to the accompanying drawings, the same numbers in different accompanying drawings denote the same or similar elements unless otherwise indicated. The embodiments described in the following examples do not denote all embodiments consistent with the disclosure. On the contrary, the embodiments are merely instances of apparatuses and methods consistent with some aspects of the disclosure as recited in the appended claims.

It should be noted that all action for acquiring signals, information, or data in the disclosure are taken under the premise of complying with corresponding data protection laws and policies of the local country and obtaining authorization from the corresponding apparatus owner.

The disclosure relates to the technical field of communication, and in particular to an antenna module and an electronic device.

An antenna module can include a primary transceiving unit and a diversity receiving unit. When the diversity receiving unit and the primary transceiving unit work simultaneously, a transmission signal from an antenna of the primary transceiving unit will enter an antenna of the diversity receiving unit through spatial coupling, thus interfering with the performance of the diversity receiving unit. For example, the receiving sensitivity of the diversity receiving unit is reduced, and even signal blockage of a low-noise amplifier will be caused in some cases, leading to a failure in a receiving function.

In view of the problems mentioned in the background, in the related art, it is common practice to add a frequency-selective filter, such as a surface acoustic wave (SAW) filter or a bulk acoustic wave (BAW) filter to an input end of a low-noise amplifier. However, the output impedance of the filter is generally in the vicinity of 50 Ohm. Consequently, a conjugate matching state between an antenna and a high-impedance low-noise amplifier is changed, and the design of an antenna module sacrifices the broadband advantage of an electronic device.

Accordingly, the disclosure provides an antenna module and an electronic device to improve the receiving sensitivity of a diversity receiving unit without sacrificing an antenna frequency band range.

Figure 1:
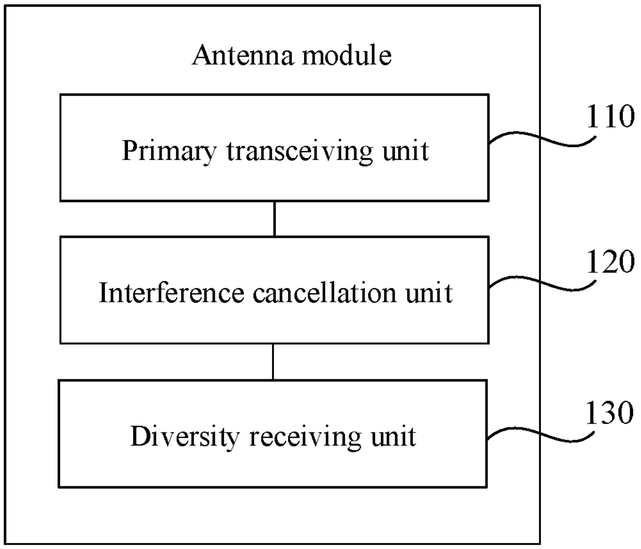
FIG. 1 is a structural block diagram of an antenna module according to an illustrative embodiment of the disclosure.

FIG. 1 is a schematic diagram of an antenna module according to an embodiment of the disclosure. As shown in FIG. 1, the antenna module includes a primary transceiving unit 110, a diversity receiving unit 130, and an interference cancellation unit 120.

The primary transceiving unit 110, wherein the primary transceiving unit includes a first antenna.

The diversity receiving unit 130, wherein the diversity receiving unit includes a second antenna.

The interference cancellation unit 120, wherein the interference cancellation unit includes a signal output unit, the signal output unit is configured to transmit a cancellation signal to the second antenna, the cancellation signal is configured to cancel a spatially-coupled interference signal received by the second antenna, and the spatially-coupled interference signal is a transmission signal entering the second antenna from the first antenna through spatial coupling.

In an example of the disclosure, the primary transceiving unit is responsible for transmitting and receiving a radio frequency signal, which is implemented through the first antenna. The diversity receiving unit is merely responsible for receiving a signal without transmitting the signal, which is implemented through the second antenna.

The transmission signal of the primary transceiving unit may be interpreted as a radio frequency signal transmitted outwards by the primary transceiving unit.

When the antenna module works, the diversity receiving unit may normally receive an external signal through the second antenna. In addition, the primary transceiving unit may transmit the radio frequency signal outwards through the first antenna, and the radio frequency signal transmitted will inevitably be received by the second antenna in a spatial coupling manner. Thus, the portion, entering the second antenna through spatial coupling, of the radio frequency signal may be interpreted as the spatially-coupled interference signal. Even considering the signal attenuation caused by the isolation between the primary transceiving unit and the diversity receiving unit, signal power of the spatially-coupled interference signal is still high, for example, it is still greater than 1 decibel (dB) compression point power of the low-noise amplifier. Consequently, the low-noise amplifier is intermodulated three times, so that the receiving sensitivity is reduced. Moreover, signal blockage of the low-noise amplifier may be caused in some cases, leading to a failure in a receiving function.

Thus, in the example of the disclosure, the interference cancellation unit is newly added, which includes the signal output unit. One cancellation signal is transmitted to the second antenna through the signal output unit, so as to cancel the spatially-coupled interference signal received by the second antenna. Accordingly, the influence on the low-noise amplifier from the spatially-coupled interference signal is reduced, and the receiving sensitivity of the low-noise amplifier is improved.

It should be noted that a process of canceling the spatially-coupled interference signal in the example of the disclosure may be interpreted as partially canceling the spatially-coupled interference signal or completely canceling the spatially-coupled interference signal. Under these two conditions, signal power of a target signal obtained by canceling the spatially-coupled interference signal by the cancellation signal is smaller than preset power, for example, target power is smaller than the 1 dB compression point power of the low-noise amplifier.

Thus, in some embodiments, the signal power of the target signal obtained by canceling the spatially-coupled interference signal by the cancellation signal is smaller than the 1 dB compression point power of the low-noise amplifier.

In some embodiments, an optional working voltage and working current of the low-noise amplifier on the electronic device are small, so that 1 dB compression points are low. For example, in some embodiments, the 1 dB compression point power of the low-noise amplifier is smaller than −5 dBm.

The condition that the cancellation signal completely cancels the spatially-coupled interference signal means that the two signals have the same amplitude and opposite phases, and an optical cancellation effect can be obtained after the two signals are superimposed.

In some embodiments, the interference cancellation unit further includes an initial interference signal acquisition unit, and the signal output unit includes a signal adjustment unit;

one end of the signal adjustment unit is connected to the initial interference signal acquisition unit, and the other end of the signal adjustment unit is configured to transmit the cancellation signal to the second antenna; and the initial interference signal acquisition unit is configured to acquire an initial interference signal, and the signal adjustment unit is configured to adjust the initial interference signal, so as to generate and output the cancellation signal.

In the example of the disclosure, in order to enable the signal output unit to output the cancellation signal satisfying requirements, the initial interference signal may be acquired through the initial interference signal acquisition unit first and then adjusted through the signal adjustment unit to generate and output the cancellation signal.

In the example of the disclosure, the initial interference signal acquisition unit may be in various forms.

In some embodiments, the initial interference signal acquisition unit may include a first coupler, where one end of the first coupler is coupled to the first antenna, and the other end of the first coupler is connected to the signal adjustment unit.

In the example of the disclosure, part of the transmission signal in the first antenna is coupled to the signal adjustment unit through the first coupler, so as to obtain the initial interference signal. Then the initial interference signal is adjusted through the signal adjustment unit to generate and output the cancellation signal. That is, in the example of the disclosure, initial interference information may be acquired in a coupling manner.

In some other embodiments, the initial interference signal acquisition unit may also be another signal generation unit, such as a signal source or an oscillator, connected to the input end of the signal adjustment unit. Thus, one initial interference signal is generated through the signal generation unit and then adjusted through the signal adjustment unit to generate and output the cancellation signal.

In some embodiments, the signal output unit further includes a second coupler, where one end of the second coupler is coupled to the second antenna, and the other end of the second coupler is connected to the signal adjustment unit.

In the example of the disclosure, after being obtained through the signal adjustment unit, the cancellation signal may be coupled to the second antenna through the second coupler. Since the cancellation signal is coupled to the second antenna through the second coupler, the input impedance of the low-noise amplifier is not affected by the signal output unit. Accordingly, a function of improving the receiving sensitivity of the diversity receiving unit without sacrificing an antenna frequency band range is realized.

In some embodiments, the signal adjustment unit includes an attenuator and a phase shifter that are mutually connected.

In the example of the disclosure, the initial interference signal adjusts the amplitude and phase of the signal under the action of the attenuator and the phase shifter respectively, so as to form the cancellation signal.

In addition, considering that the antenna module may work in one or more frequency bands, the spatially-coupled interference signal may vary with different working frequency bands. Thus, in order to improve the receiving sensitivity of the diversity receiving unit in different frequency bands, it is required to control generation of a corresponding cancellation signal.

Thus, in some embodiments, the interference cancellation unit further includes a first processing module, where the first processing module is connected to the attenuator and the phase shifter; and the first processing module is configured to determine a first parameter and a second parameter corresponding to power of the transmission signal according to a preset corresponding relation between the power and a working parameter, adjust a working parameter of the attenuator according to the first parameter, and adjust a working parameter of the phase shifter according to the second parameter.

In the example, the corresponding relation between the power and the working parameter may be prerecorded. For example, the amplitudes and phases of the spatially-coupled interference signals generated under different power of the transmission signal are premeasured and prerecorded in an experimental stage. The first parameter and the second parameter capable of generating the cancellation signal are set specifically according to the amplitudes and phases of the spatially-coupled interference signals generated under different power of the transmission signal. Then the corresponding relation between the first parameter and the second parameter used under different power of the transmission signal may be recorded in the experimental stage.

Thus, when the antenna module is applied, the first processing module of the interference cancellation unit may determine the first parameter and the second parameter corresponding to the power of the transmission signal according to the preset corresponding relation between the power and the working parameter, adjust the working parameter corresponding to the attenuator according to the first parameter, and adjust the working parameter corresponding to the phase shifter according to the second parameter, so as to generate the corresponding cancellation signal.

In some other embodiments, the interference cancellation unit further includes a second processing module, where the second processing module is connected to the second antenna, the attenuator, and the phase shifter; and the second processing module is configured to determine a third parameter and a fourth parameter according to the spatially-coupled interference signal received by the second antenna, adjust a working parameter of the attenuator according to the third parameter, and adjust a working parameter of the phase shifter according to the fourth parameter.

In the example, the second processing module may acquire the spatially-coupled interference signals received by the second antenna under different power of the transmission signal individually. Thus, the second processing module determines a third corresponding parameter and a fourth corresponding parameter according to the actual conditions of the spatially-coupled interference signals acquired, adjusts the working parameter corresponding to the attenuator according to the third parameter, and adjusts the working parameter corresponding to the phase shifter according to the fourth parameter, so as to generate the corresponding cancellation signal.

It should be noted that the first processing module and the second processing module may be the same module.

In some embodiments, the diversity receiving unit further includes a low-noise amplifier and a matching circuit, where an input end of the matching circuit is connected to the second antenna, and an output end of the matching circuit is connected to the low-noise amplifier; impedance values of the first antenna and the second antenna are positioned in a first quadrant of a Smith chart, and spaced from an edge position of the Smith chart by a distance smaller than a first preset threshold; and a maximum gain input impedance value and an optimal input noise coefficient value of the low-noise amplifier are positioned in a fourth quadrant of the Smith chart, and spaced from an edge position of the Smith chart by a distance smaller than a second preset threshold.

In the example of the disclosure, the impedance values of the first antenna and the second antenna are set to be positioned in the first quadrant of the Smith chart and as close to an edge of the Smith chart as possible, and the maximum gain input impedance value and an optimal input noise coefficient point of the low-noise amplifier are set to be positioned in the fourth quadrant of the Smith chart and as close to an edge of the Smith chart as possible. The input impedance of the antennas is positioned in the first quadrant, and a maximum gain point and an optimal noise coefficient point of the low-noise amplifier are set to be positioned in the fourth quadrant. Thus, conjugate matching can be realized in a wide frequency band through a simple parallel matching device. The requirement for the matching circuit is reduced, and equivalent receiving efficiencies of an active receiving antenna are positioned at an optimal level in a wide frequency band range.

In some embodiments, the impedance values of the first antenna and the second antenna are greater than 200 Ohm.

In some embodiments, the first antenna is any one of a metal-bezeled antenna, a microstrip disk antenna (MDA), and a flexible printed circuit (FPC) antenna (a type of stamped antenna), and the second antenna is any one of a metal-bezeled antenna, an MDA, and an FPC antenna.

In some embodiments, in order to satisfy more diversified frequency band requirements, one or more primary transceiving units may be provided. For example, in some embodiments, the primary transceiving unit may include a 4th generation (4G) primary transceiving unit and/or a 5th generation (5G) primary transceiving unit, a first antenna of the 4G primary transceiving unit is a 4G low-frequency antenna, and a first antenna of the 5G primary transceiving unit is a 5G low-frequency antenna.

Illustratively, when the primary transceiving unit in the antenna module includes a 4G primary transceiving unit and a 5G primary transceiving unit, an E-UTRA-NR dual connectivity (EN-DC) mode in 5G non-independent networking may be implemented. In the mode, an electronic device takes a 4G base station as a base station accessed first to transmit signaling, and takes a 5G base station as an extended enhanced data transmission channel.

It can be understood that when there are a plurality of primary transceiving units, the spatially-coupled interference signals may be transmission signals entering the diversity receiving unit from the plurality of primary transceiving units through spatial coupling.

In addition, in some embodiments, except for being coupled to the first antenna through the first coupler, the signal adjustment unit may also be connected to the first antenna via other circuits capable of transmitting the transmission signals.

The antenna module in the foregoing example will be illustratively described below in conjunction with a specific antenna module in FIG. 2.

Figure 2:
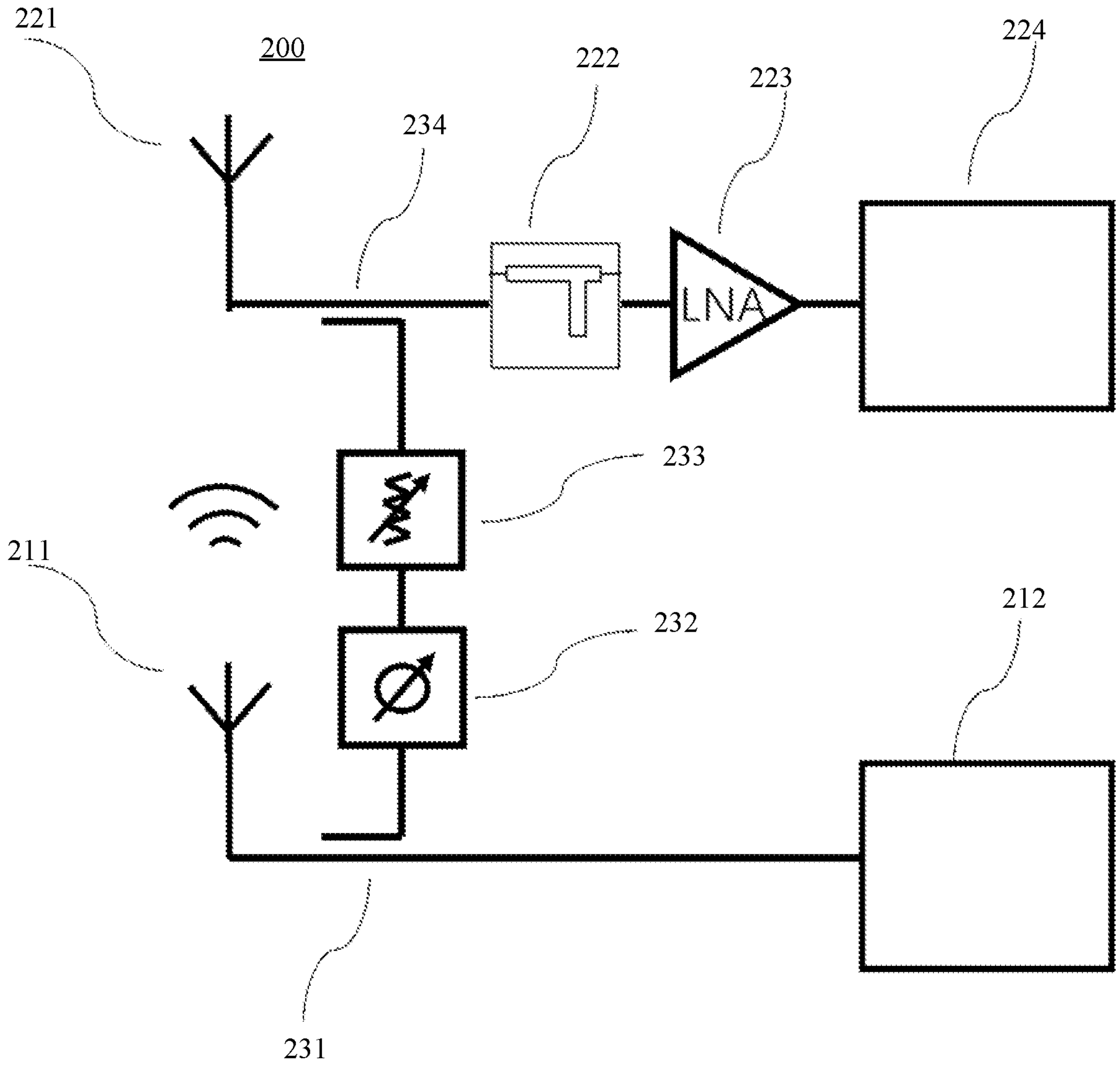
FIG. 2 is a schematic diagram of an antenna module according to an illustrative embodiment of the disclosure.

FIG. 2 is a schematic diagram of another antenna module 200 according to an embodiment of the disclosure. As shown in FIG. 2, the antenna module 200 includes a diversity receiving unit, a primary transceiving unit, and an interference cancellation unit, where the diversity receiving unit includes a second antenna 221, a matching circuit 222, a low-noise amplifier 223, and a receiving chip 224, which are sequentially connected; the primary transceiving unit includes a first antenna 211 and a transceiving chip 212, which are sequentially connected; and the interference cancellation unit includes a first coupler 231, an attenuator 232, a phase shifter 233, and a second coupler 234, where the first coupler 231 is connected between the first antenna 211 and the transceiving chip 212, the second coupler 234 is connected between the second antenna 221 and the matching circuit 222, and the first coupler 231 is connected to the second coupler 234 through the attenuator 232 and the phase shifter 233.

In the example of the disclosure, part of the transmission signal of the first antenna is coupled to the interference cancellation unit through the first coupler to adjust an amplitude and phase of the signal under the action of the attenuator and the phase shifter respectively. Then, an adjusted signal is coupled to the second antenna through the second coupler to form a cancellation signal. The cancellation signal and a spatially-coupled interference signal in the second antenna are superposed to reduce the influence on the low-noise amplifier from the spatially-coupled interference signal. Moreover, the interference cancellation unit is connected to the diversity receiving unit through the second coupler. Thus, the input impedance of the low-noise amplifier is not affected by the interference cancellation unit. Accordingly, a function of improving the receiving sensitivity of the diversity receiving unit without sacrificing an antenna frequency band range is realized.

Figure 3:
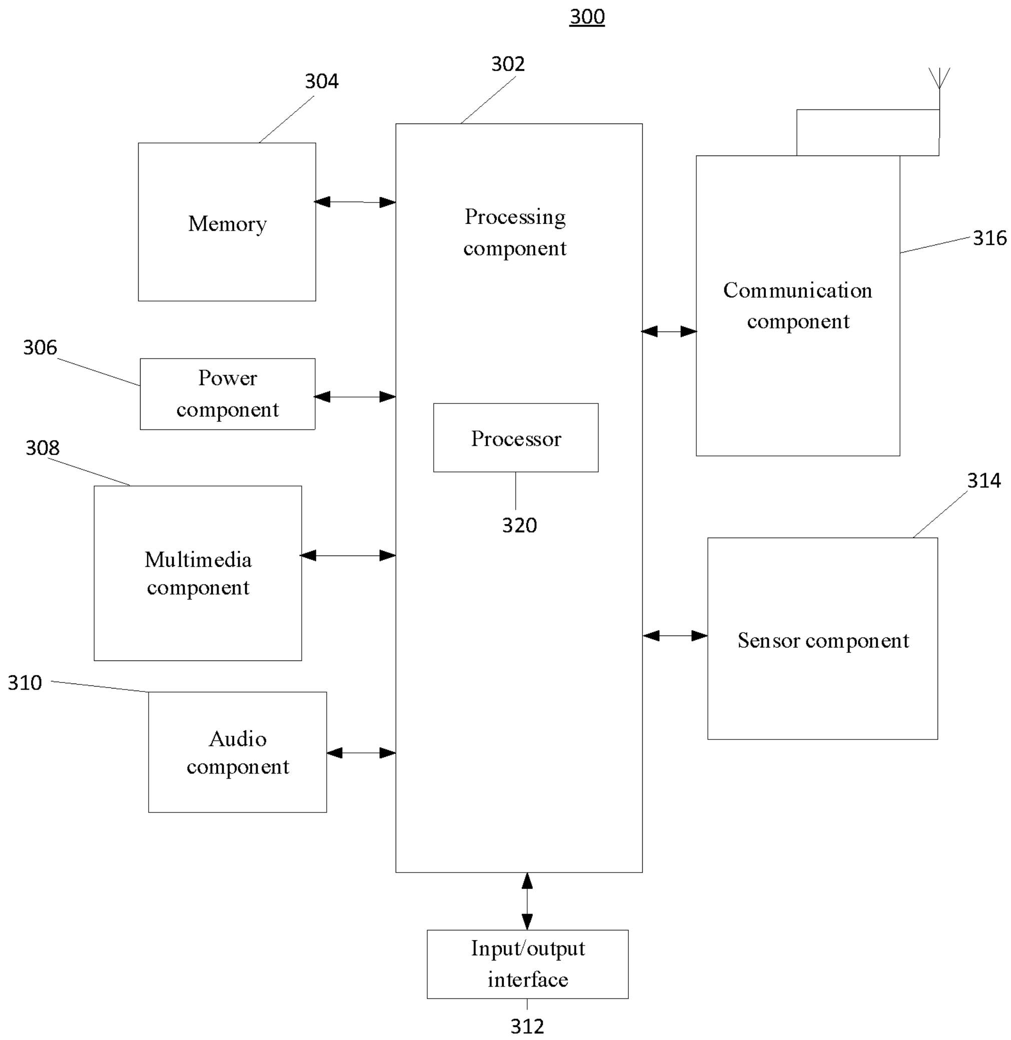
FIG. 3 is a block diagram of an electronic device according to an illustrative embodiment of the disclosure.

FIG. 3 is a block diagram of an electronic device 300 according to an example. For example, the electronic device 300 may be a mobile phone, or a digital broadcast terminal, a message transceiving device, a gaming console, a tablet device, a medical device, a fitness device, a personal digital assistant, etc. having the antenna module in any one of the foregoing examples.

With reference to FIG. 3, the electronic device 300 may include one or more of a processing component 302, a memory 304, a power component 306, a multimedia component 308, an audio component 310, an input/output interface 312, a sensor component 314, and a communication component 316.

The processing component 302 generally controls overall operations of the electronic device 300, including operations associated with display, phone calls, data communications, camera operations, and recording operations. The processing component 302 may include one or more processors 320 to execute an instruction. In addition, the processing component 302 may include one or more modules, so as to facilitate interaction between the processing component 302 and other components. For example, the processing component 302 may include a multimedia module, so as to facilitate interaction between the multimedia component 308 and the processing component 302.

The memory 304 is configured to store various types of data to support operations on the electronic device 300. Instances of such data include an instruction, operated on the electronic device 300, for any application or method, contact data, phonebook data, messages, pictures, video, etc. The memory 304 may be implemented through any type of volatile or non-volatile storage devices or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 306 provides power for various components of the electronic device 300. The power component 306 may include a power supply management system, one or more power supplies, and other components associated with power generation, management, and distribution for the electronic device 300.

The multimedia component 308 includes a screen that provides an output interface between the electronic device 300 and a user. In some examples, the screen may include a liquid crystal display (LCD) and a touch panel (TP). If including the touch panel, the screen may be implemented as a touch screen, so as to receive an input signal from the user. The touch panel includes one or more touch sensors to sense touches, swipes, and gestures on the touch panel. The touch sensor can measure duration and pressure associated with a touch or swipe operation while sensing a boundary of a touch or swipe action. In some examples, the multimedia component 308 includes a front-facing camera and/or a rear-facing camera. When the electronic device 300 is in an operating mode, for example, a photographing mode or a video mode, the front-facing camera and/or the rear-facing camera may receive external multimedia data. Each of the front-facing camera and the rear-facing camera may be a fixed optical lens system or have a focal length and an optical zoom capability.

The audio component 310 is configured to output and/or input an audio signal. For example, the audio component 310 includes a microphone (MIC) configured to receive an external audio signal when the electronic device 300 is in the operating mode, for example, a calling mode, a recording mode, and a speech recognition mode. The audio signal received may be further stored in the memory 304 or sent via the communication component 316. In some examples, the audio component 310 further includes a speaker configured to output the audio signal.

The input/output interface 312 provides an interface between the processing component 302 and a peripheral interface module, which may be a keyboard, a click wheel, a button, etc. These buttons may include, but are not limited to, a home button, a volume button, a start button, and a lock button.

The sensor component 314 includes one or more sensors configured to provide state assessments for various aspects of the electronic device 300. For example, the sensor component 314 may detect an on/off state of the electronic device 300 and relative locating of the components. For example, the components are a display and a keypad of the electronic device 300. The sensor component 314 may also detect a change in position of the electronic device 300 or a component of the electronic device 300, the presence or absence of contact between the user and the electronic device 300, orientation or acceleration/deceleration of the electronic device 300, and a change in temperature of the electronic device 300. The sensor component 314 may include a proximity sensor configured to detect the presence of a nearby object in the absence of any physical contact. The sensor component 314 may further include light sensors, such as a complementary metal-oxide-semiconductor transistor (CMOS) or a charge coupled device (CCD) image sensor configured to be used in imaging application. In some examples, the sensor component 314 may further include an acceleration sensor, a gyroscopic sensor, a magnetic sensor, a pressure sensor, or a temperature sensor.

The communication component 316 is configured to facilitate wired or wireless communication between the electronic device 300 and other devices. The electronic device 300 may access a wireless network based on a communication standard, for example, wireless fidelity (WiFi), 3G, 4G, 5G, etc., or their combinations. In an example, the communication component 316 receives a broadcast signal or broadcast related information from an external broadcast management system via a broadcast channel. In an example, the communication component 316 further includes a near field communication (NFC) module to facilitate short-distance communication. For example, the NFC module may be implemented on the basis of a radio frequency identification (RFID) technology, an infrared data association (IrDA) technology, an ultra wide band (UWB) technology, a Bluetooth (BT) technology, etc.

In an example, the electronic device 300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements.

Other embodiments of the disclosure will readily occur to those skilled in the art upon consideration of the description and practice of the disclosure. The disclosure is intended to cover any variations, uses, or adaptive changes of the disclosure, which follow general principles of the disclosure and include common general knowledge or customary technical means in the art not disclosed in the disclosure. The description and the examples are merely deemed illustrative, and the true scope and spirit of the disclosure are indicated by the following claims.

It should be understood that the disclosure is not limited to precise structures described above and shown in the accompanying drawings, and various modifications and changes can be made without departing from the scope of the disclosure. The scope of the disclosure is limited merely by the appended claims.

What is claimed is:

1. An antenna module, comprising:

a primary transceiving unit, wherein the primary transceiving unit comprises a first antenna;

a diversity receiving unit, wherein the diversity receiving unit comprises a second antenna; and an interference cancellation unit, wherein the interference cancellation unit comprises a signal output unit, the signal output unit is configured to transmit a cancellation signal to the second antenna, the cancellation signal is configured to cancel a spatially-coupled interference signal received by the second antenna, and the spatially-coupled interference signal is a transmission signal entering the second antenna from the first antenna through spatial coupling, wherein the interference cancellation unit further comprises an initial interference signal acquisition unit, and the signal output unit comprises a signal adjustment unit, wherein one end of the signal adjustment unit is connected to the initial interference signal acquisition unit, and the other end of the signal adjustment unit is configured to transmit the cancellation signal to the second antenna; and the initial interference signal acquisition unit is configured to acquire an initial interference signal, and the signal adjustment unit is configured to adjust the initial interference signal, so as to generate and output the cancellation signal, wherein the signal adjustment unit comprises an attenuator and a phase shifter, which are mutually connected, wherein the interference cancellation unit further comprises a first processing module, and the first processing module is connected to the attenuator and the phase shifter; and the first processing module is configured to determine a first parameter and a second parameter corresponding to power of the transmission signal according to a preset corresponding relation between the power and a working parameter, adjust a working parameter of the attenuator according to the first parameter, and adjust a working parameter of the phase shifter according to the second parameter.

2. The antenna module according to claim 1, wherein the initial interference signal acquisition unit comprises a first coupler, one end of the first coupler is coupled to the first antenna, and the other end of the first coupler is connected to the signal adjustment unit.

3. The antenna module according to claim 1, wherein the signal output unit further comprises a second coupler, one end of the second coupler is coupled to the second antenna, and the other end of the second coupler is connected to the signal adjustment unit.

4. The antenna module according to claim 1, wherein the interference cancellation unit further comprises a second processing module, and the second processing module is connected to the second antenna, the attenuator, and the phase shifter; and the second processing module is configured to determine a third parameter and a fourth parameter according to the spatially-coupled interference signal received by the second antenna, adjust a working parameter of the attenuator according to the third parameter, and adjust a working parameter of the phase shifter according to the fourth parameter.

5. The antenna module according to claim 1, wherein the diversity receiving unit further comprises a low-noise amplifier and a matching circuit, an input end of the low-noise amplifier is connected to the second antenna, and an output end of the low-noise amplifier is connected to the matching circuit; impedance values of the first antenna and the second antenna are positioned in a first quadrant of a Smith chart, and spaced from an edge position of the Smith chart by a distance smaller than a first preset threshold; and a maximum gain input impedance value and an optimal input noise coefficient value of the low-noise amplifier are positioned in a fourth quadrant of the Smith chart, and spaced from an edge position of the Smith chart by a distance smaller than a second preset threshold.

6. The antenna module according to claim 1, wherein impedance values of the first antenna and the second antenna are greater than 200 Ohm.

7. The antenna module according to claim 1, wherein the primary transceiving unit comprises a 4th generation (4G) primary transceiving unit and/or a 5th generation (5G) primary transceiving unit, the first antenna of the 4G primary transceiving unit is a 4G low-frequency antenna, and the first antenna of the 5G primary transceiving unit is a 5G low-frequency antenna.

8. The antenna module according to claim 1, wherein the first antenna is any one of a metal-bezeled antenna, a microstrip disk antenna (MDA), and a flexible printed circuit (FPC) antenna, and the second antenna is any one of a metal-bezeled antenna, an MDA, and an FPC antenna.

9. An electronic device, comprising an antenna module, the antenna module comprising:

a primary transceiving unit, wherein the primary transceiving unit comprises a first antenna;

a diversity receiving unit, wherein the diversity receiving unit comprises a second antenna; and an interference cancellation unit, wherein the interference cancellation unit comprises a signal output unit, the signal output unit is configured to transmit a cancellation signal to the second antenna, the cancellation signal is configured to cancel a spatially-coupled interference signal received by the second antenna, and the spatially-coupled interference signal is a transmission signal entering the second antenna from the first antenna through spatial coupling, wherein the interference cancellation unit further comprises an initial interference signal acquisition unit, and the signal output unit comprises a signal adjustment unit, wherein one end of the signal adjustment unit is connected to the initial interference signal acquisition unit, and the other end of the signal adjustment unit is configured to transmit the cancellation signal to the second antenna; and the initial interference signal acquisition unit is configured to acquire an initial interference signal, and the signal adjustment unit is configured to adjust the initial interference signal, so as to generate and output the cancellation signal, wherein the signal adjustment unit comprises an attenuator and a phase shifter, which are mutually connected, wherein the interference cancellation unit further comprises a first processing module, and the first processing module is connected to the attenuator and the phase shifter; and the first processing module is configured to determine a first parameter and a second parameter corresponding to power of the transmission signal according to a preset corresponding relation between the power and a working parameter, adjust a working parameter of the attenuator according to the first parameter, and adjust a working parameter of the phase shifter according to the second parameter.

10. An electronic device, comprising the antenna module according to claim 2.

11. An electronic device, comprising the antenna module according to claim 3.

12. An electronic device, comprising the antenna module according to claim 4.

13. An electronic device, comprising the antenna module according to claim 5.

14. An electronic device, comprising the antenna module according to claim 6.

* * * * *